(No Model.)

W. A. LEGGO, Jr.
SPROCKET WHEEL FOR CHAINS.

No. 522,427.  Patented July 3, 1894.

Witnesses
Chas. H. Smith
Harold Purell

Inventor
William A. Leggo Jr.
per Lemuel W. Serrell
Atty.

UNITED STATES PATENT OFFICE.

WILLIAM A. LEGGO, JR., OF HARTSDALE, NEW YORK.

SPROCKET-WHEEL FOR CHAINS.

SPECIFICATION forming part of Letters Patent No. 522,427, dated July 3, 1894.

Application filed September 8, 1893. Serial No. 485,065. (No model.)

*To all whom it may concern:*

Be it known that I, WILLIAM A. LEGGO, Jr., a subject of the Queen of Great Britain, residing at Hartsdale, in the county of Westchester and State of New York, have invented an Improvement in Sprocket-Wheels for Chains, of which the following is a specification.

Chains or sprocket wheels have heretofore been made with radial bars having projections at their outer ends and means by which such bars can be set out gradually to compensate for the wear upon the projections of the wheel, or in the joints of the chains.

My present invention is intended for varying the relative speed of the driving and driven sprocket wheels, thereby adapting the speed and leverage to bicycles and similar vehicles, so that the driving wheel of said vehicle can be propelled at a greater speed and with less power for traveling upon a nearly level road, or with less speed and greater power for ascending hills or grades of greater or less steepness. With this object in view I construct a sprocket wheel with the lugs or projections that engage the chain variable, so as to obtain two diameters: that is to say, the lugs receiving the chain can be moved outwardly to obtain the larger diameter, or moved inwardly to obtain the smaller diameter, the parts being so constructed that the arms carrying the lugs are radially locked in position when such arms are moved to the extreme outward position, and when moved to the extreme inward position such lugs or projections are supported directly by the other portions of the sprocket wheel. The arms having the lugs or projections that engage the chain, are fitted to swing, so that when thrown outwardly such arms are locked automatically, or when swung inwardly they bear against the body of the wheel and are supported thereby.

Figure 1:
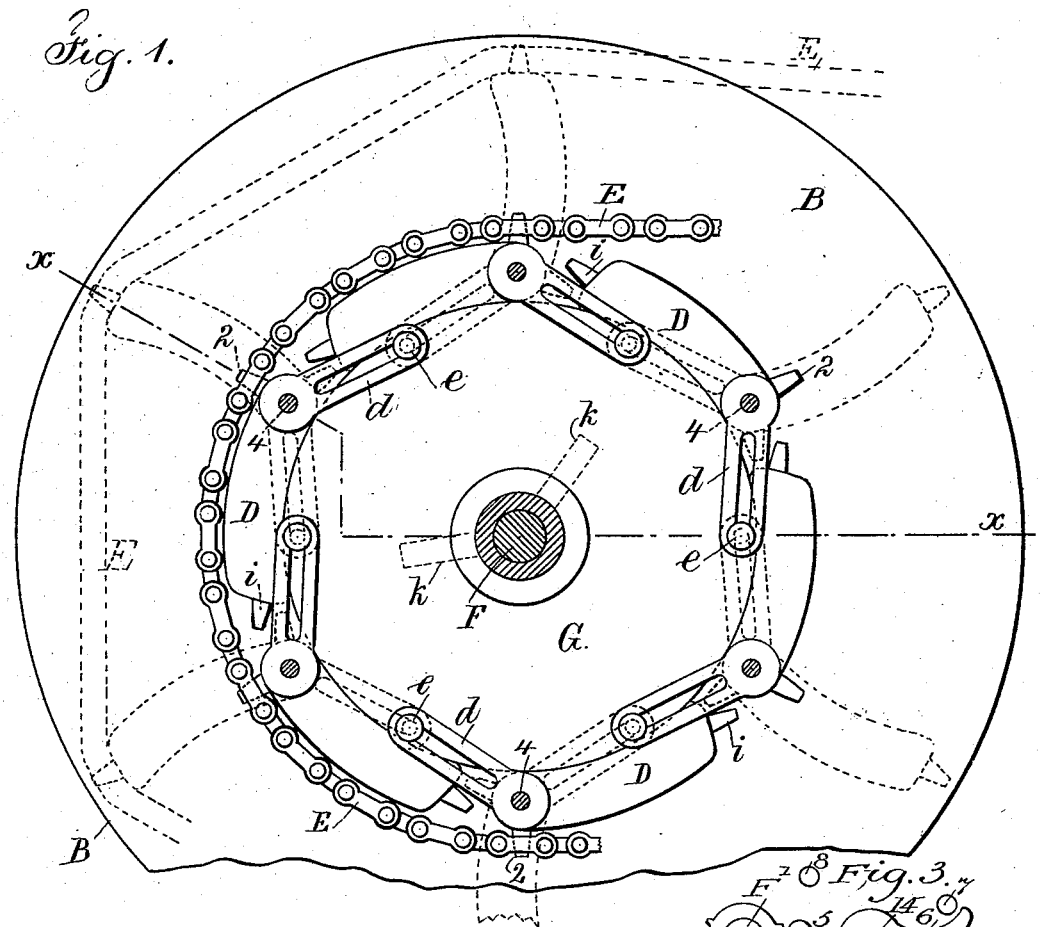
Figures 2, 3:
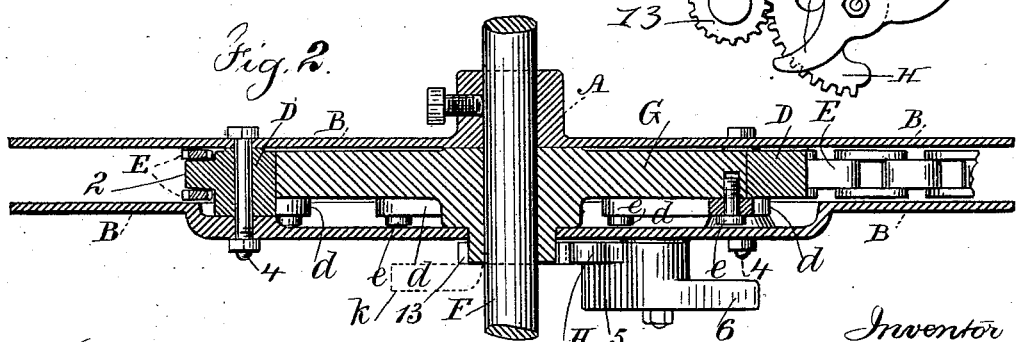

In the drawings, Figure 1, is an elevation with the cap plate removed showing the present improvement with the swinging arms. Fig. 2, is a cross section of the same at the line $x, x,$ of Fig. 1, and Fig. 3 is a detached view of the gearing.

The hub A is provided with disks B, which preferably are at such a distance apart that the chain E that is to engage the projections or lugs of the sprocket wheel is freely received between the outer portions of such disks, and the arms D, which are provided with the lugs or projections 2, are between these disks and such arms can be thrown outwardly for increasing the diameter of the wheel, or contracted inwardly to reduce the diameter of the sprocket wheel. These arms D are represented as swinging upon pivots 4, that pass through the disks and through the arms.

The arms D are provided with slotted elbows $d$, receiving the pins $e$, which are permanently fixed upon the collar G, which is adapted to turn freely upon the shaft F, and the positions of the elbows $d$, and pins $e$, are such that when the collar G is turned in one direction the pins $e$ will move along in the slots in the elbows $d$ very near the pivot pins 4, toward the outer ends of the elbows, and in so doing the arms D will be swung upon the pivots and turn inwardly, and when the collar G is rotated in the opposite direction the pins $e$ acting in the slots of the elbows $d$ will swing the arms D so as to throw their ends outwardly into the position indicated by dotted lines in Fig. 1, and thereby increase the effective diameter of the sprocket wheel, and when in this latter position the pressure of the chain comes upon such arms, and there is no tendency to rotate the collar G because the pressure of the slotted elbows upon the pins is on the radial lines passing from the pins to the center of the collar G.

It will be observed that there are two sets of lugs upon the arms D, the one set of lugs 2, being near the pivots 4, and the other set of lugs $i$ being at the ends of the arms D, and the proportions of the parts are to be such that the lugs 2, will properly engage the links of the chain when the arms are contracted to form the sprocket wheel of a small diameter, and the lugs $i$ will properly engage the links of the chain when the arms are moved outwardly to form the sprocket wheel of the large diameter.

In order to rotate the collar G any suitable mechanism may be employed, such for instance as the projecting arms $k$ shown by dotted lines in Figs. 1 and 2 that are outside one of the disks B and can be acted upon by the foot of the rider or by a stop controlled by the rider and thrown into the path of either one arm or the other as the sprocket wheel may be rotating and thus either project or retract the arms by a partial rotation of the collar G in its relation to the sprocket wheel. I prefer, however, to provide gear teeth 13, upon a hub of the collar G, which teeth engage a sector H, which is pivoted at 14, and provided with fingers 5, and 6, that can be acted upon either by the foot or by the hand, or by coming into contact with a projection 7, that is moved into the path of one finger 6, or a projection 8, that can be moved into the path of the other finger 5, as said arms and the sector are being rotated by the shaft F, and treadles or other devices usually employed in velocipedes and other vehicles for propelling the same, so that the sector H, may be turned either in one direction or the other and communicate to the collar G a half rotation.

Where this expansive sprocket wheel is employed on a bicycle and the driven sprocket wheel is not variable in its diameter, then it is advantageous to make use of idlers or take-up pulleys to prevent the slack chain from hanging loosely, and to allow for the chain assuming its proper condition when the sprocket wheel is either expanded or contracted. If, however, the driven wheel is made expansible in the same manner as the driving wheel, then the effective length of the chain will remain unchanged, but when the relative sizes of the sprocket wheels are changed so as to vary, the leverage of one against the other, the sprocket wheel that has been expanded must be contracted to slacken the chain before the other sprocket wheel is expanded to take up the slack, and the relative sizes of the sprocket wheels can be varied according to the desired change of speed and leverage between the driving and driven wheels. It will be apparent that when the chain is upon the lugs 2 and the sprocket wheel is at its smallest diameter, when a movement of the collar is made for increasing the diameter of such sprocket wheel, one swinging arm lifts the chain off the projection upon the next swinging arm and the chain slides upon the curved back surfaces of the arms without being engaged by such arms until the arms have been swung nearly to the extreme larger diameter of the sprocket wheel, and hence the projections upon the ends of the arms do not engage the recesses of the chain until the full diameter of the sprocket wheel is obtained, and when the collar is partially rotated to withdraw the arms to the smallest diameter the lugs on the ends of the arms withdraw from the recesses in the chain with facility and the chain slides upon the convex surfaces of the arms until the diameter is reduced to the smallest size and the projections 2 engage the chain.

I do not claim swinging arms as the same have been used with one set of projections, to engage the chain when the sprocket wheel is enlarged, the other set of projections being upon stationary rings or disks and not in line with the projections on the arms.

I claim as my invention—

1. The combination in a sprocket wheel with a disk of a circular range of arms, each having two projections in line with each other, one near the pivot and the other at or near the outer end and adapted to engage the chain and means for swinging the arms to enlarge the effective diameter of the sprocket wheel or the reverse, substantially as specified.

2. The combination in a sprocket wheel of two disks between which the chain runs, swinging arms and pivots for connecting the arms and the disks, slotted elbows upon the arms, a collar movable around the axis of the sprocket wheel and pins upon the collar engaging the slotted elbows and acting to swing the arms, substantially as set forth.

3. The combination in a sprocket wheel, of disks between which the chain is received, arms and pivots connecting the arms and the disks, said arms having two sets of projections for engaging the chain, slotted elbows and a collar and pins upon the collar for giving motion to the slotted elbows and to the arms, substantially as set forth.

4. The combination in a sprocket wheel, of disks between which the chain is received, arms and pivots connecting the arms and the disks, said arms having two sets of projections for engaging the chain, slotted elbows and a collar and pins upon the collar for giving motion to the slotted elbows and to the arms, a toothed sector, the teeth of which engage teeth upon the collar, and projections for turning the sector in one direction or the other to move the respective parts and increase or lessen the effective diameter of the sprocket wheel, substantially as set forth.

5. The combination in a sprocket wheel, of pivoted arms and two sets of projections upon the arms to engage the chain, a collar and connections therefrom for moving the arms, and mechanism for acting upon the collar to give to the same a partial rotation to swing the arms and increase or decrease the effective diameter of the sprocket wheel without necessarily stopping the rotation of such wheel, substantially as set forth.

Signed by me this 6th day of September, 1893.

WILLIAM A. LEGGO, JR.

Witnesses:
WILLIAM G. MOTT,
A. M. OLIVER.